United States Patent
Kohmoto

Patent Number: 5,327,188
Date of Patent: Jul. 5, 1994

[54] ADAPTER DEVICE

[75] Inventor: Shinsuke Kohmoto, Tokyo, Japan

[73] Assignee: Asahi Kogaku Kogyo Kabushiki Kaisha, Tokyo, Japan

[21] Appl. No.: 999,378

[22] Filed: Dec. 31, 1992

[30] Foreign Application Priority Data

Jan. 10, 1992 [JP] Japan .............. 4-004162[U]

[51] Int. Cl.⁵ ................ G03B 11/00; G03B 17/00
[52] U.S. Cl. .................. 354/295; 354/289.11
[58] Field of Search .......... 354/295, 286, 288, 289.1, 354/289.11

[56] References Cited

U.S. PATENT DOCUMENTS

| | | | |
|---|---|---|---|
| 3,335,648 | 8/1967 | Aster | 354/295 |
| 4,314,749 | 2/1982 | Komoto | 354/196 X |
| 4,327,984 | 5/1982 | Evans | 354/295 |
| 4,942,414 | 7/1990 | Takahashi et al. | 354/295 |
| 5,040,011 | 8/1991 | Tiffen | 354/295 |
| 5,097,280 | 3/1992 | Nomura | 354/295 X |

FOREIGN PATENT DOCUMENTS 56-19010  2/1981  Japan .
60-118109  8/1985  Japan .

Primary Examiner—David M. Gray
Assistant Examiner—Jae N. Noh
Attorney, Agent, or Firm—Sandler Greenblum & Bernstein

[57] ABSTRACT

An adapter device is adapted to a camera lens, including a stationary ring and a focus ring rotatably attached to the stationary ring. The adapter device is provided with a first ring which is arranged to be fixed to the stationary ring of the camera lens. A second ring is rotatably attached to the first ring and is arranged to be fixed to the focus ring of the camera lens. A click stop mechanism is provided between the first ring and second ring, for click-stopping the second ring at a prescribed angular position. The click stop mechanism includes a plurality of click grooves formed on the inner peripheral surface of the second ring, a click member provided to the outer peripheral surface of the first ring, which is capable of fitting into the click groove, and a leaf spring for urging the click member into the click groove.

21 Claims, 5 Drawing Sheets

ADAPTER DEVICE

BACKGROUND OF THE INVENTION

The present invention relates to an adapter device which can be detachably attached to a camera lens and can apply a click feeling to an operator when a photographing magnification is set.

Conventionally, a macro lens which is capable of close-up photographing is known. This type of macro lens employs a stationary ring, a focus ring rotatably connected to the stationary ring, and a sliding ring in which a focus lens is held and movable along an optical axis of the focus lens. The focus ring and sliding ring are coupled by a helicoid construction for moving the sliding ring in the optical axis upon rotation of the focus ring.

In the conventional macro lens, a slip off phenomenon of the focus point occurs due to the slight rotation of a focus ring after an indication has been matched to a prescribed value of the photographing magnification scale by rotating the focus ring. As a result, it has been troublesome to adjust the magnification scale, and an adjusting error tends to occur. Once the adjusting error has occurred, a scattering of the photographing magnification happens in the case of clinical photographing, for example, photographing the front of a row of teeth in the mouth of human being. Accordingly, the precise comparison and/or judgment to the clinical photograph which is photographed by using the macro lens becomes difficult.

It should be noted that a camera lens, where a click stop mechanism is integrally installed into a lens body of the camera lens is known, thereby enabling a click stop in a prescribed magnification. However, the camera lens integrally equipped with the click stop mechanism is very expensive because of such exclusive use, is very troublesome in operation of setting the prescribed magnification, and is not suitable for so-called mass production.

SUMMARY OF THE INVENTION

It is therefore an object of the present invention to provide an adapter device, capable of attaching to a camera lens easily without injuring the camera lens, and enables the setting of a desired photographing magnification, quickly.

It is a further object of the present invention to provide an adapter device, capable of photographing at a prescribed photographing magnification in a click stop state, without reconstruction of a general or ordinary camera lens.

In order to accomplish the above object, according to a first aspect of the present invention, there is provided an adapter device, which is detachably attached to a camera lens, including a stationary ring and a rotary ring rotatably attached to the stationary ring. A first ring is arranged to be attached to the stationary ring and have an inner periphery which is to be interfitted to the outer periphery of the stationary ring. A second ring is rotatably connected to the first ring, as is arranged to be attached to the rotary ring, and has an inner periphery which is to be interfitted to the outer periphery of the rotary ring. A click stop device is provided between the first ring and second ring, for click-stopping the second ring at a prescribed angular position.

According to a second aspect of the present invention, there is provided an adapter device which is attached to a camera lens including a stationary ring and a focus ring rotatably attached to the stationary ring. A first ring is arranged to be fixed to the stationary ring of the camera lens, a second ring is rotatably attached to the stationary ring and is arranged to be fixed to the focus ring of the camera lens. A click stop device is provided between the first ring and second ring, for click-stopping the second ring at a prescribed angular position.

According to a third aspect of the present invention, there is provided an adapter device which is detachably attached to a camera lens including a first ring being stationary relative to a camera body and a focus ring rotatably connected to the stationary member, for adjusting a focal point. A first ring is arranged to be attached to the first ring. A second ring is arranged to be attached to the focus ring. A click stop device is provided between the first and second rings, for click-stopping the second ring at a prescribed angular position.

According to a fourth aspect of the present invention, there is provided an adapter device which is detachably attached to a camera lens provided to a camera body, the camera lens includes a focus ring that is rotatably arranged, for adjusting a focal point. A first ring is arranged to be attached to a portion being stationary to the camera body. A second ring is arranged to be attached to the focus ring. A click stop means is provided between the first and second rings, for click-stopping the second ring at a prescribed angular position.

The above and other objects, features and advantages of the present invention will become more apparent from the following detailed description which is to be read in conjunction with the accompanying drawings.

DETAILED DESCRIPTION OF THE PREFERRED EMBODIMENTS

Hereinafter, referring now to the accompanying drawings, a preferred embodiment of an adapter device, according to the present invention, is explained in detail.

Figure 1:
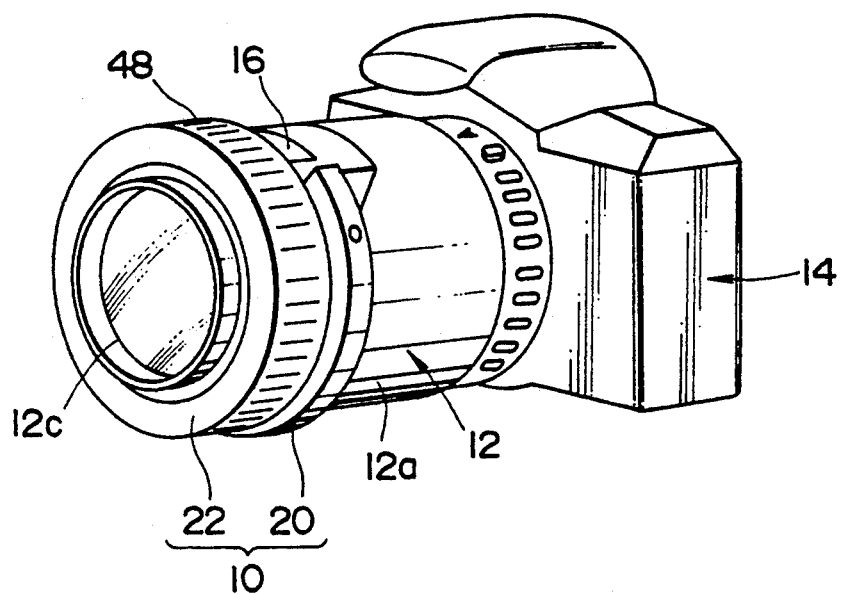
FIG. 1 is a perspective view showing a camera with an interchangeable lens to which one embodiment of an adapter device, according to the present invention, is mounted.

FIG. 1 is a perspective view showing a use condition of an adapter device 10 of the present embodiment, for applying a click feeling to an operator when a photographing magnification is set. More specifically, an interchangeable lens 12 is connected to a camera body 14 in a disconnectable manner. The adapter device 10 is detachably attached to the distal end of the interchangeable lens 12. In the present embodiment, the interchangeable lens 12 is a conventional macro-lens by which ordinary photographing in a predetermined object distance as well as a close-up photographing with a photographing magnifications of 1 to 1/25, for example, is executable. More particularly, one of the photographing magnifications of "1", "½", "1/5", "1/10" and "1/25" is freely selectable. Note that the photographing magnification of "1" means life size.

Figure 2:
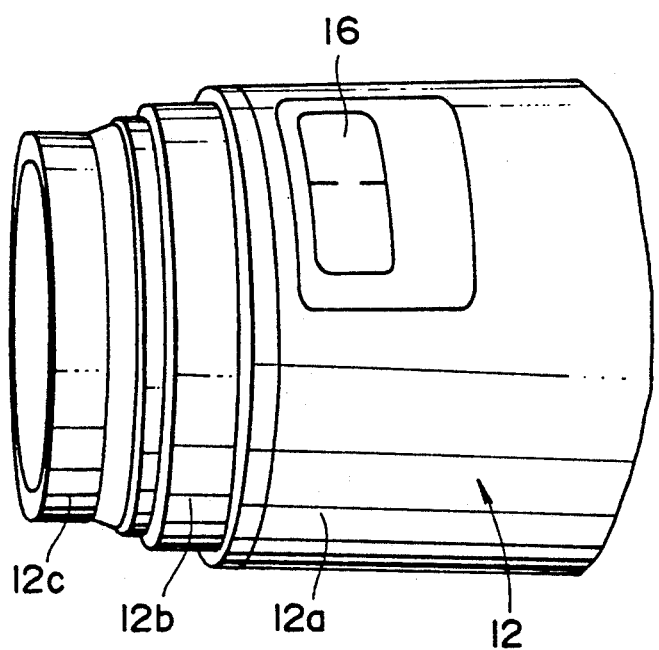
FIG. 2 is an enlarged perspective view showing the distal end portion of the interchangeable lens.

As shown in FIG. 2, the interchangeable lens 12 includes a stationary ring 12a which is arranged to be fixed to the camera body 14, a focus ring 12b as a rotary ring for focusing, which is rotatably connected to the stationary ring 12a around an optical axis of a focus lens (not shown), and a sliding sleeve 12c supporting the focus lens therein, for moving the focus lens along the optical axis direction of the lens. The sliding sleeve 12c is moved upon rotation of the focus ring 12b, enabling focusing.

Figure 3:
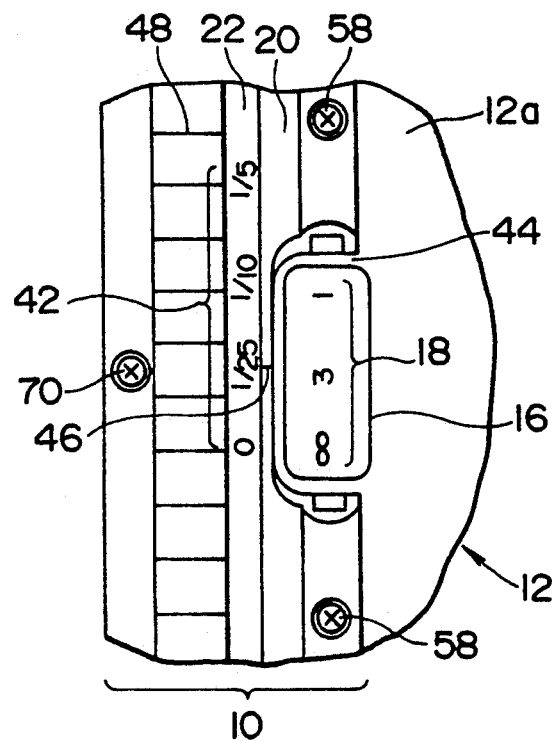
FIG. 3 is a top view showing an upper portion of the adapter device where it is mounted to the interchangeable lens.

Formed on the upper portion of the outer circumferential surface of the stationary ring 12a is a distance scale observation window 16. Through the window 16, the operator of the adapter device 10 or the camera 14 can observe a distance scale 18 (as shown in FIG. 3) which is described or printed on the upper portion of the outer circumferential surface of the focus ring 12b and can recognize what an object distance is settled in the interchangeable lens 12 at present. It should be noted that a rubber ring (not shown), utilized for easy operation, is usually attached to the distal end of the focus ring 12b.

Figure 4:
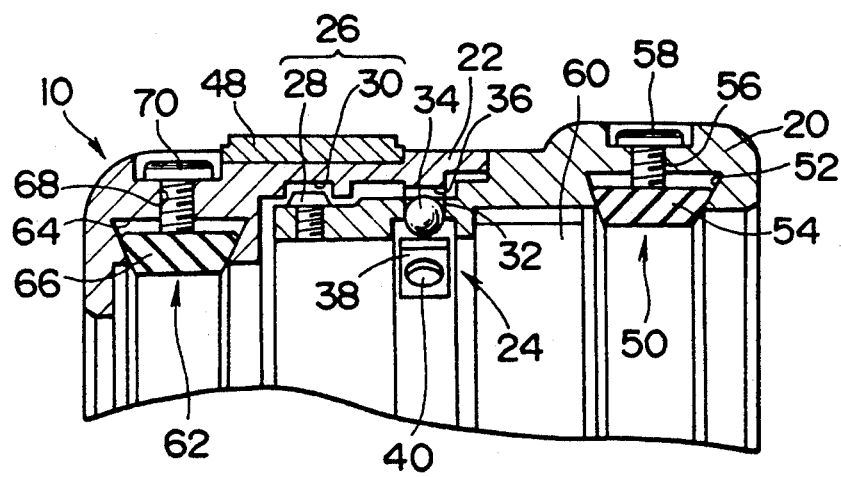
FIG. 4 is a side cross-sectional view showing a construction of the adapter device.

The adapter device 10, to be detachably attached to the interchangeable lens 12, includes, as shown in FIG. 4, a first ring 20, which is arranged to be fixedly fitted to the outer periphery of the stationary ring 12a of the interchangeable lens 12, and a second ring 22, which is rotatably fitted to the outer periphery of the first ring 20 and which is arranged to be fixedly connected to the outer periphery of the focus ring 12b. The adapter device 10 further includes a click stop mechanism 24 provided between the first ring 20 and the second ring 22, for click-stopping the second ring 22 relative to the first ring 20 at a prescribed angular position thereby applying a click feeling to the operator in the photographing magnification setting operation, and a coupling mechanism 26 for coupling the second ring 22 to the first ring 20, in such a fashion that the second ring 22 is rotatable around the first ring 20 and prevented from moving in an axial direction of the first ring 20.

The coupling mechanism 26 includes a plurality of guide pins 28, which are positioned on the outer circumferential surface of the distal end of the first ring 20, and guide groove 30, which is formed on the inner circumferential surface of the second ring 22 and which extends in a circumferential direction of the second ring 22. The guide pins 28 are arranged in a circumferential direction thereof and each of guide pins 28 extends radially outwardly. The guide pins 28 are loosely fitted into the guide groove 30, so that second ring 22 is able to rotate around the first ring 20, but is not able to move in the axial direction of the first ring 20.

Figure 5:
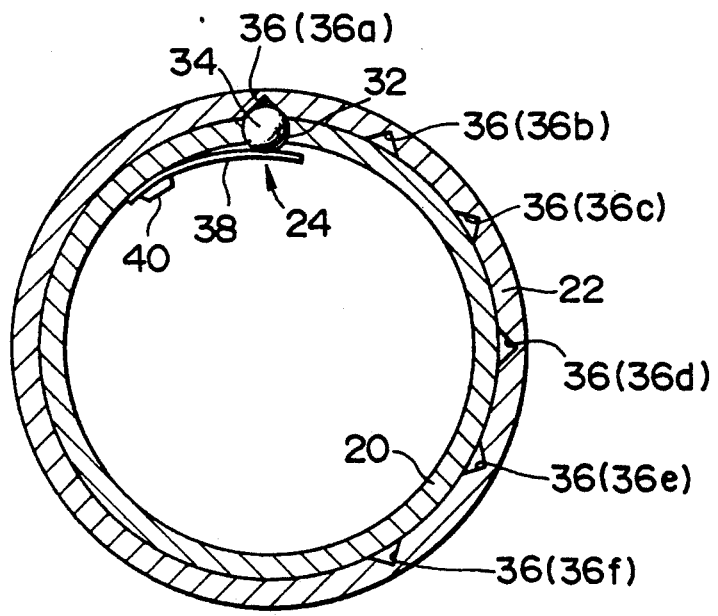
FIG. 5 is a front cross-sectional view showing a construction of the adapter device.

As shown in FIGS. 4 and 5, the click stop mechanism 24 includes a throughhole 32 which is formed on the substantially middle portion in the axial direction of the first ring 20, and a ball 34 utilized as a click member which is received in the throughhole 32 so as to be movable in a radial direction of the first ring 20. The click stop mechanism 24 further includes and a plurality of click grooves 36 which are formed on the inner circumferential surface of the second ring 22, arranged in the circumferential direction thereof, and each of which extends in the axial direction thereof. A leaf spring 38 is provided for urging the ball 34 radially outwardly. The one end of the leaf spring 38 is fixed to the inner periphery of the second ring 22 by means of a fixing pin 40 and the other end thereof is pressedly contact to the ball 34, thereby urging the ball 34 to be pressedly fitted into one of the plural click grooves 36. The shape of the click grooves 36 is set to be triangular in the front view, as shown in FIG. 5.

The click grooves 36 are arranged to be formed in such a manner that they correspond to a plurality of numerals which constitute a magnification scale 42, which is described on the outer circumferential surface of the second ring 22, as shown in FIG. 3. The described numerals of magnification scale 42 correspond to a plurality of numerals which constitute the distance scale 18.

Particularly, the symbol "∞" of the distance scale 18 which means the infinity is described on one side of the distance scale 18, corresponds to the numeral "0" of the magnification scale 42 which is described on the same one side of the magnification scale 42. The numeral "3" of the distance scale 18, which means that the object distance is set to be 3 meters, corresponds to the numeral "1/25" of the magnification scale 42. The numeral "1" of the distance scale 18, which means that the object distance is set to be 1 meter, corresponds to the numeral "1/10" of the magnification scale 42. The numeral "0.7" (not shown in FIG. 3) of the distance scale 18, which means that the object distance is set to be 0.7 meter, corresponds to the numeral "1/5" of the magnification scale 42. The numeral "0.5" (not shown in FIG. 3) of the distance scale 18, which means that the object distance is set to be 0.5 meter, corresponds to the numeral "½" (not shown in FIG. 3) of the magnification scale 42. The numeral "0.5" (not shown in FIG. 3) of the distance scale 18, which means that the object distance is set to be 0.5 meter, corresponds to the numeral "1" (not shown in FIG. 3) of the magnification scale 42.

Furthermore, as shown in FIG. 5, the click groove 36a of the click grooves 36 is formed so as to correspond to the numeral "0" of the magnification scale 42 thereby corresponding to the symbol "∞" of the distance scale 18. The click groove 36b of the click grooves 36 is formed so as to correspond to the numeral "1/25" of the magnification scale 42 thereby corresponding to the numeral "3" of the distance scale 18. The click groove 36c of the click grooves 36 is formed so as to correspond to the numeral "1/10" of the magnification scale 42 thereby corresponding to the numeral "1" of the distance scale 18. The click groove 36d of the click grooves 36 is formed so as to correspond to the numeral "1/5" of the magnification scale 42 thereby corresponding to the numeral "0.7" of the distance scale 18. The click groove 36e of the click grooves 36 is formed so as to correspond to the numeral "½" of the magnification scale 42 thereby corresponding to the numeral "0.5" of the distance scale 18. The click groove 36f of the click grooves 36 is formed so as to correspond to the numeral "1" of the magnification scale 42 thereby corresponding to the numeral "0.3" of the distance scale 18.

As shown in FIG. 3, a cut-away portion 44, through which the operator can see the window 16, is formed on the outer circumferential portion of the first ring 20. An indication 46, for indicating the magnification scale 42, is described on the outer circumferential portion of the first ring 20. The location of the indication 46 is set to a central position of the outer periphery of the cut-away portion 44 on the second ring side. Note that an operation ring 48, formed of a rubber, is closely fitted on the outer circumferential surface of the second ring 22 for steady operation.

Figure 6:
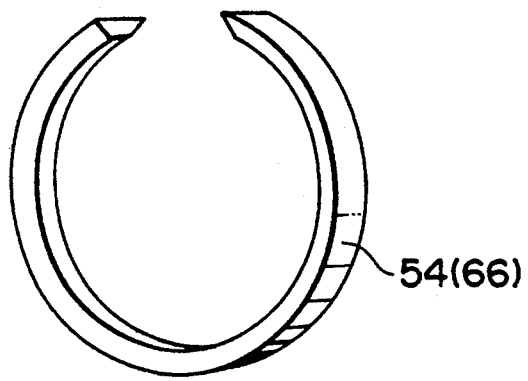
FIG. 6 is a perspective view showing an elastic member which is equipped to a fixing mechanism.

The first ring 20 is provided with a first fixing mechanism 50 for being fixed to the stationary ring 12a of the interchangeable lens 12. The first fixing mechanism 50 includes a first insertion groove 52 which is formed on the inner peripheral surface of the first ring 20 and extends in the circumferential direction. The cross-section of the first insertion groove 52 is set to a trapezoid shape. A first elastic member 54 formed of a rubber or elastic resin or the like is inserted into the first insertion groove 52. The first elastic member 54 is formed into a so-called C-shape, as shown in FIG. 6, and the cross-section thereof is set to a trapezoid shape thereby preventing dropping out from the first insertion groove 52.

A plurality of first threaded holes 56 are formed so as to penetrate the first ring 20. The first threaded holes 56 are equally arranged in the circumferential direction of the first ring 20. A first fixing screw 58 is engaged with each of the first threaded holes 56. By rotating each of the first screws 58 in a normal direction, such as the clockwise direction, it advances radially inwardly thereby pushing the first elastic member 54 to be pressingly contacted to the outer periphery of the stationary ring 12a of the interchangeable lens 12. Accordingly, the first ring 20 of the adapter device 10 is fixed to the stationary ring 12a of the interchangeable lens 12. On the other hand, by rotating it in a reverse direction, such as the counter-clockwise direction, it is retracted radially outward thereby being released from the outer periphery of the stationary ring 12a. As a result, the first ring 20 is set to be freely rotatable around the stationary ring 12a.

It should be noted that an attaching member 60, formed of a cloth or the like, is adhered on the inner peripheral surface of the first ring 20 for protecting the outer peripheral surface of the stationary ring 12a from the inner peripheral surface of the first ring 20, when the adapter device 10 is fitted to the interchangeable lens 12.

The second ring 22 is provided with a second fixing mechanism 62 for being fixed to the focus ring 12b of the interchangeable lens 12. The second fixing mechanism 62 includes a second insertion groove 64 which is formed on the inner peripheral surface of the second ring 22 and extends in the circumferential direction. The cross-section of the second insertion groove 64 is set to a trapezoid shape. A second elastic member 66, formed of a rubber or elastic resin or the like, is inserted into the second insertion groove 64. The second elastic member 66 is formed into a so-called C-shape, as shown in FIG. 6, as well as the first elastic member 54. The cross-section thereof is set to a trapezoid shape, thereby preventing dropping out from the second insertion groove 64.

A plurality of second threaded holes 68 are formed so as to penetrate the second ring 22. The second threaded holes 68 are equally arranged in the circumferential direction of the second ring 22. A second fixing screw 70 is engaged with each of the second threaded holes 68. By rotating each of the second screws 70 in a normal direction, such as the clockwise direction, it advances radially inward thereby pushing the second elastic member 66 to be pressingly contacted to the outer periphery of the focus ring 12b of the interchangeable lens 12. Accordingly, the second ring 22 of the adapter device 10 is fixed to the focus ring 12b of the interchangeable lens 12. On the other hand, by rotating it in a reverse direction, such as the counter-clockwise direction, it is retracted radially outwardly thereby being released from the outer periphery of the focus ring 12b. As a result, the second ring 22 is set to be freely rotatable around the focus ring 12b.

Hereinafter, the description will be given to a attaching operation of the adapter device 10 of the present embodiment to the interchangeable lens 12 by the operator, with reference to the accompanying drawings of FIGS. 7 and 8.

Initially, the first screws 58 provided to the first ring 20, and second screws 70 provided to the second ring 22, are loosened therefrom before the adapter device 10 is attached to the interchangeable lens 12. In the loosened condition of first and second screws 58 and 70, the first and second elastic members 54 and 66 expand radially outward in the first ring 20 and the second ring 22, respectively. This expansion prevents the first and second elastic members 54 and 66 from interfering with the stationary ring 12a and the rotary sleeve 12b of the interchangeable lens 12, respectively, upon an interfitting operation of the adapter device 10 with the interchangeable lens 12. On the other hand, the focus ring 12b is rotated such that the symbol "∞" of the distance scale 18 is displayed in the window 16, on the interchangeable lens 12 side before the interfitting operation.

Figure 7:
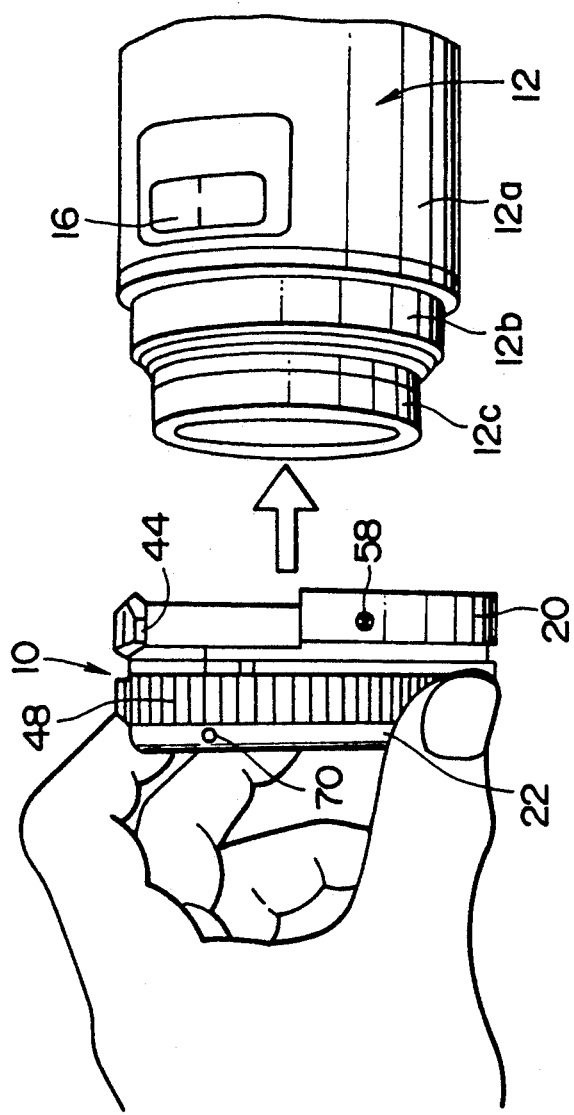
FIG. 7 is a view for explaining the attaching operation by an operator of the adapter device to the interchangeable lens.
Figure 8:
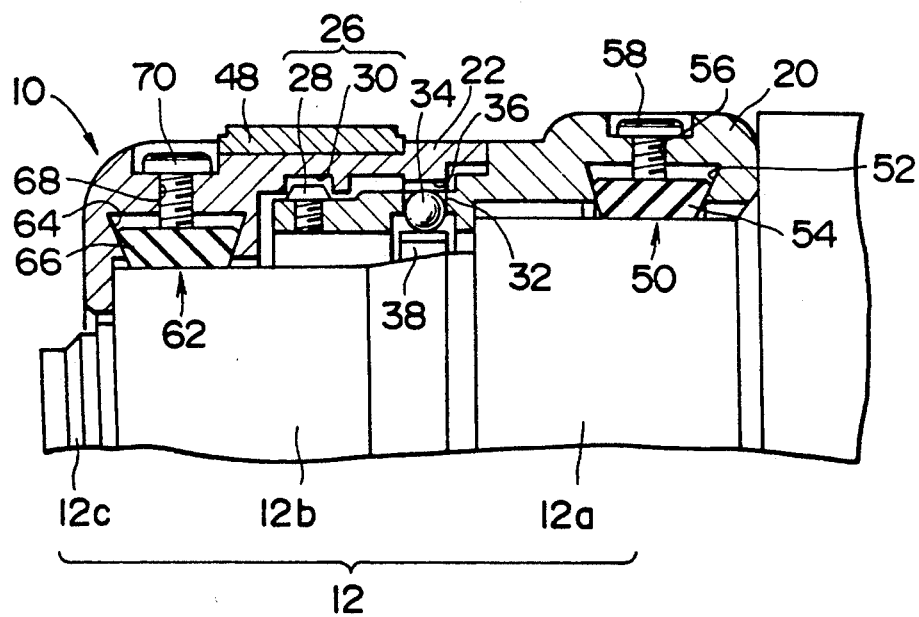
FIG. 8 is a side cross-sectional view showing the adapter device where it is mounted to the interchangeable lens.

Maintaining such a loosened condition, the operator interfits the adapter device 10 to the distal end of the interchangeable lens 12, as shown in FIG. 7. Where the adapter device 10 is completely interfitted with the distal end of the interchangeable lens 12, the sliding sleeve 12c slightly penetrates the second ring 22. The outer circumferential surface of the focus ring 12b opposes the inner circumferential surface of the second elastic member 66 of the second fixing mechanism 62, and the outer circumferential surface of the stationary ring 12a opposes to the inner circumferential surface of the first elastic member 54 of the first fixing mechanism 50, as shown in FIG. 8.

In the interfitted condition, the operator rotates the first ring 20 around the stationary ring 12a of the interchangeable lens 12, so as to match the indication 46 described on the outer periphery of the first ring 20 with the symbol "∞" of the distance scale 18, which is displayed in the window 16. Then, the operator rotates the second ring 22 around the focus ring 12b of the interchangeable lens 12, so as to match the numeral "0" of the magnification scale 42 positioned on the outer periphery of the second ring 22 with the indication 46. By executing such a rotation of the second ring 22, the ball 34 is inserted into the click groove 36a of the click grooves 36 engaged therewith. That is to say, the second ring 22 is click-stopped relative to the focus ring 12b by the click stop mechanism 24.

Maintaining such a matching condition, the operator fastens the first screws 58, thereby urging the first elastic member 54 radially inward. As a result, the first elastic member 54 is pressingly contacted with the outer circumferential surface of the stationary ring 12a, whereby the first ring 20 is fixed to the stationary ring 12a, and the stationary ring 12a is rotated integral with the first ring 20. Then, also maintaining such a matching condition, the operator fastens the second screws 70, thereby urging the second elastic member 66 radially inward. Accordingly, the second elastic member 66 is pressingly contacted with the outer circumferential surface of the focus ring 12b, whereby the second ring 22 is fixed to the focus ring 12b. The focus ring 12b is rotated integral with the second ring 22.

Thus, the clip adapter ring 10 is fixedly attached or fastened to the distal end of the interchangeable lens 12 in a detachable manner. The adapter device 10 can be detached from the interchangeable lens 12 only by loosing the first and second screws 58 and 70.

Once the adapter device 10 has been attached to the interchangeable lens 12, the magnification of the interchangeable lens 12 can be changed by rotating the second ring 22 of the adapter device 10. When the second ring 22 is rotated, the focus ring 12b, integrally connected to the second ring 22, is simultaneously rotated, and thereby moving the sliding ring 12c for holding the focus lens in the optical direction. Accordingly, the photographing magnification is changed. Upon rotation of the second ring 22, one of click grooves 36 has come to oppose the ball 32 as the click member. When the prescribed numeral of the magnification scale 42 is matched with the indication 46, the predetermined click groove 36, corresponding to the prescribed numeral of the magnification scale 42, opposes the ball 32. The ball 32 is accordingly inserted into the predetermined click groove 36 and engaged therewith. As a result, the second ring 22 (accordingly, focus ring 12b) is click-stopped where the prescribed magnification is executed in the interchangeable lens 12.

More specifically, when the operator wishes to set the life size scale, i.e., "1" of the photographing magnification, the operator rotates the second ring 22 until the numeral "1" of the magnification scale 42 is matched to the indication 46. When the numeral "1" of the magnification scale 42 is matched to the indication 46, the click groove 36f has come to oppose the ball 32. The ball 32 is accordingly inserted into the click groove 36f and engaged therewith. As a result, the second ring 22 (accordingly, focus ring 12b) is click-stopped where the life size scale of the photographing magnification is set in the interchangeable lens 12.

Where the camera equipped with the adapter device 10, of the present embodiment, is applied to clinical photographing, especially, to the dental photographing, a macro-strobe (not shown) is detachably attached to the distal end of the sliding ring 12c which is protruded from the second ring 22.

As is described is the foregoing description, in accordance with the present invention, there is provided an adapter device 10 which is capable of attaching to a camera lens easily without injuring the camera lens, and enables setting of a desired photographing magnification quickly. The adapter device 10 provides the capability of photographing at a prescribed photographing magnification in a click stop state, without reconstruction of a general or ordinary camera lens.

It would be clear that the present invention is not limited to the embodiment described above, nor those illustrated in the drawings, and the invention can be modified without departing from the spirit and scope of the claimed invention.

Though, the first ring 20 of the adapter device 10 is to be fixed to the stationary ring 12a of the interchangeable lens 12 in the above-described embodiment, it could be possible that the first ring 20 is to be fixed to a stationary portion without the stationary ring 12a, which is stationary to the camera body. It could be also possible that the first ring 20 is to be fixed directly to the camera body. It would be necessary that the first ring 20 is fixed to a stationary part, which is stationary relative to the camera body.

Furthermore, though the cross-sections of the first and second insertion grooves 52 and 64 are set to be trapezoidal in shape, in the above-mentioned embodiment, it could be possible that the cross-sections of the first and/or second insertion grooves 52 and 64 are set to be a rectangular of half-cylindrical. Please note that the cross-section of the first and/or second elastic members 54 and 66 could be set to be rectangular or half-cylindrical, according to the modification of the cross-section of the first and/or second insertion grooves 52 and 64.

Furthermore, though the distal ends of the first and second screws 58 and 70 are respectively contacted to the outer periphery of the first and second elastic members 54 and 66, it could be possible that the distal ends of the first and/or second screws 58 and 70 are coupled to the outer periphery of the first and second elastic members 54 and 66, respectively.

Furthermore, though the adapter device 10 is detachably attached to the interchangeable lens 12 in the above-described embodiment, it could be possible that the adapter device 10 of the present invention is detachably attached to a lens which is integrally connected to the camera body.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

The present disclosure relates to subject matters contained in Japanese Utility Model Application No. HEI 4-4162, filed on Jan. 10, 1992, which is expressly incorporated herein by reference in its entirety.

What is claimed is:

1. An adapter device which is detachably attached to a camera lens including a stationery ring and a rotary ring rotatably attached to said stationary ring, said adapter device comprising:

a first ring being arranged to be attached to said stationary ring and having an inner periphery which is to be interfitted to an outer periphery of said stationary ring;

a second ring rotatably connected to said first ring, being arranged to be attached to said rotary ring and having an inner periphery which is to be interfitted to the outer periphery of said rotary ring;

fixing means for releasably fixing said adapter device to said camera lens;

click stop means provided between said first ring and said second ring, for click-stopping said second ring at a prescribed angular position; and coupling means for coupling said second ring to said first ring as a unit, whereby said first ring, said second ring, and said click stop means may be detachably attached and removed from said camera lens as a unit.

2. The adapter device according to claim 1, wherein said fixing means comprises:
- a first fixing means for releasably fixing said first ring to said stationary ring, and
- a second fixing means for releasably fixing said second ring to said rotary ring.

3. The adapter device according to claim 2, wherein said first ring is loosely fitted to the outer periphery of said stationary ring and fixed thereto by said first fixing means, and
said second ring is loosely fitted to the outer periphery of said rotary ring and fixed thereto by said second fixing means.

4. The adapter device according to claim 3, wherein said first fixing means comprises:
- a first groove formed on the inner peripheral surface of said first ring;
- a first elastic member fitted into said first groove, and having an inner surface capable of protruding radially inward from the inner peripheral surface of said first ring; and
- at least one first fixing screw which is provided to said first ring, operable from an outside of said first ring and urges said first elastic member to pressingly contact with the outer peripheral surface of said stationary ring upon rotation thereof.

5. The adapter device according to claim 3, wherein said second fixing means comprises:
- a second groove formed on the inner peripheral surface of said second ring;
- a second elastic member fitted into said second groove, and having an inner surface capable of protruding radially inward from the inner peripheral surface of said second ring; and
- at least one second fixing screw which is provided to said second ring, operable from an outside of said second ring and urges said second elastic member to pressingly contact with the outer peripheral surface of said rotary ring upon rotation thereof.

6. The adapter device according to claim 1, wherein said coupling means couples said second ring to said first ring in such a fashion that said second ring is rotatable around said first ring and prevented from moving in an axial direction of said first ring.

7. The adapter device according to claim 6, wherein said coupling means comprises:
- an engaging groove formed on one of the inner peripheral surface of said second ring and the outer peripheral surface of said first ring; and
- an engaging pin attached to an other of the inner peripheral surface of said second ring and the outer peripheral surface of said first ring, and fitted into said engaging groove,
- whereby said second ring is rotatable around said first ring and prevented from moving in an axial direction of said first ring.

8. The adapter device according to claim 7, wherein said engaging groove is formed on the inner peripheral surface of said second ring, and the engaging pin is planted on the outer peripheral surface of said first ring.

9. The adapter device according to claim 1, wherein said click stop means comprises:
- at least one click groove formed on one of the inner peripheral surfaces of said second ring and the outer peripheral surface of said first ring;
- a click member provided to an other of the inner peripheral surfaces of said second ring and the outer peripheral surface of said first ring, and being capable of fitting into said click groove; and
- urging means for urging the click member to be fitted into said click groove.

10. The adapter device according to claim 9, wherein said click groove is formed on the inner peripheral surface of said second ring, and the click member is loosely inserted into a hole which is formed on the outer peripheral surface of said first ring.

11. The adapter device according to claim 10, wherein
said click member is a ball, and
said urging means includes a leaf spring for urging the ball into said click groove.

12. The adapter device according to claim 1, wherein said click stop means comprises:
- a plurality of click grooves formed on one of the inner peripheral surfaces of said second ring and the outer peripheral surface of said first ring, said click grooves being arranged in a circumferential direction;
- a click member provided to an other of the inner peripheral surfaces of said second ring and the outer peripheral surface of said first ring, said click member being capable of fitting into said click groove; and
- urging means for urging said click member to be fitted into one of said click grooves.

13. The adapter device according to claim 12, wherein
said click member is a ball, and
said urging means includes a leaf spring for urging the ball into one of said click grooves.

14. The adapter device according to claim 12, wherein
said plural click grooves are formed so as to correspond to positions which define a plurality of photographing magnifications, respectively.

15. An adapter device, which is detachably attached to a camera lens, including a stationary ring and a focus ring rotatably attached to said stationary ring, comprising:
- a first ring being arranged to be fixed to said stationary ring of said camera lens;
- a second ring rotatably attached to said stationary ring and being arranged to be fixed to said focus ring of said camera lens;
- fixing means for releasably fixing said adapter device to said camera lens;
- click stop means provided between said first ring and said second ring, for click-stopping said second ring at a prescribed angular position; and
- coupling means for coupling said second ring to said first ring as a unit, whereby said first ring, said second ring, and said click stop means may be detachably attached and removed from said camera lens as a unit.

16. The adapter device according to claim 15, wherein said fixing means comprises:
- a first fixing means for releasably fixing said first ring to said stationary ring, and
- a second fixing means for releasably fixing said second ring to said focus ring.

17. The adapter device according to claim 15, wherein said coupling means couples said second ring to said first ring in such a fashion that said second ring is rotatable around said first ring and prevented from moving in an axial direction of said first ring.

18. The adapter device according to claim 15, wherein said click stop means comprises:
   at least one click groove formed on one of the inner peripheral surfaces of said second ring and the outer peripheral surface of said first ring;
   a click member provided to an other of the inner peripheral surface of said second ring and the outer peripheral surface of said first ring, and being capable of fitting into said click groove; and
   urging means for urging said click member into said click groove.

19. The adapter device according to claim 15, wherein said click stop means comprises:
   a plurality of click grooves forme don one of the inner peripheral surfaces of said second ring and the outer peripheral surface of said first ring, said click grooves being arranged in a circumferential direction;
   a click member provided to an other of the inner peripheral surfaces of said second ring and the outer peripheral surface of said first ring, said click member being capable of fitting into said click grooves; and
   urging means for urging said click member into one of said click grooves.

20. An adapter device which is detachably attached to a camera lens including a stationary member being stationary relative to a camera body and a focus ring rotatably connected to said stationary member, for adjusting a focal point said adapter comprising:
   a first ring being arranged to be attached to said stationary member;
   a second ring being arranged to be attached to the focus ring;
   fixing means for releasably fixing said adapter device to said camera lens;
   a click stop means provided between said first and said second rings, for click-stopping said second ring at a prescribed angular position; and
   coupling means for coupling said second ring to said first ring as a unit, whereby said first ring, said second ring, and said click stop means may be detachably attached and removed from said camera lens as a unit.

21. An adapter device, which is detachably attached to a camera lens provided on a camera body, said camera lens including a focus ring being rotatably arranged for adjusting a focal point, comprising:
   a first ring being arranged to be attached to a portion being stationary to the camera body;
   a second ring being arranged to be attached to said focus ring;
   fixing means for releasably fixing said adapter device to said camera lens;
   click stop means provided between said first and said second rings, for click-stopping said second ring at a prescribed angular position; and
   coupling means for coupling said second ring to said first ring as a unit, whereby said first ring, said second ring, and said click stop means may be detachably attached and removed from said camera lens as a unit.

* * * * *

UNITED STATES PATENT AND TRADEMARK OFFICE
CERTIFICATE OF CORRECTION

PATENT NO. : 5,327,188
DATED : July 5, 1994
INVENTOR(S) : Shinsuke KOHMOTO

It is certified that error appears in the above-indentified patent and that said Letters Patent is hereby corrected as shown below:

At column 8, line 50 (claim 1, line 2), change "stationery" to ---stationary---.

At column 11, line 20 (claim 19, line 3), change "forme don" to ---formed on---.

Signed and Sealed this

Twenty-first Day of March, 1995

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,327,188
DATED : July 5, 1994
INVENTOR(S) : IWASA et al.

It is certified that error appears in the above-indentified patent and that said Letters Patent is hereby corrected as shown below:

On the title page:

Item: [75] Inventors: after the third inventor's name, change "Tama" to --Zama--;
[30] Foreign Application Priority Data, change "1-68355" to --1-68335--;
[56] References Cited, under "OTHER PUBLICATIONS", line 2, change "63-26663" to --63-266633--;

Col. 3, line 12, after "63-160017" insert --,--.

Col. 5, line 24, change "part" to --parts--.

Col. 9, line 4, change "cold" to --could--;
line 66, delete "of".

Col. 10, line 36, change "lit" to --11,--.

Col. 11, line 12, after "means)" insert --1--;
line 34, after "the" (second occurrence) insert --write--.

Col. 12, line 7, after "having" insert --a--;
line 14, after "becomes" insert --O--;
line 40, after " "2" " insert --,--;
line 44, after " "15" " insert --,--.

UNITED STATES PATENT AND TRADEMARK OFFICE
CERTIFICATE OF CORRECTION

PATENT NO. : 5,327,188
DATED : July 5, 1994
INVENTOR(S) : IWASA et al.

Page 2 of 3

It is certified that error appears in the above-indentified patent and that said Letters Patent is hereby corrected as shown below:

Col. 13, line 15, change "$A = D_1 \cdot (D_1 \cdot D_2)$" to -- $A = D_1 \cdot (\overline{D_1 \cdot D_2})$ --.

Col. 14, line 5, after "$D_1$" insert --,--;

line 14, change "$D = D_1 \cdot (D_1 \cdot D_3)$" to -- $D = D_1 (\overline{D_1 \cdot D_3})$ --.

Col. 16, line 3, after "and" insert --2--.

Col. 17, line 53, change "$D_1$" to -- $\overline{D_1}$ --;

line 55, change "$D_1$" to -- $\overline{D_1}$ --;

line 57, change "$D_1$" to -- $\overline{D_1}$ --.

Col. 18, line 2, change "$D_1$" to -- $\overline{D_1}$ --;

line 64, change "length sin" to --lengths in--.

UNITED STATES PATENT AND TRADEMARK OFFICE
CERTIFICATE OF CORRECTION

PATENT NO. : 5,327,188
DATED : July 5, 1994
INVENTOR(S) : IWASA et al.

It is certified that error appears in the above-indentified patent and that said Letters Patent is hereby corrected as shown below:

Col. 22, line 60, change "( for example )" to --(for example)--;
line 61, change "( for" to --(for--.

Col. 23, line 9, change "$D_1$" to -- $\overline{D_1}$ --;

line 10, change "$D_1$" to -- $\overline{D_1}$ --;

line 12, change "$D_1$" to -- $\overline{D_1}$ --.

Col. 24, line 62, before "applying" insert --(e)--.

line 26, after "groups" insert --,--.

Col. 27, line 11, after "includes" insert --:--.

Signed and Sealed this

Fourth Day of April, 1995

Attest:

BRUCE LEHMAN

*Attesting Officer*   *Commissioner of Patents and Trademarks*